(12) United States Patent
Yoshida et al.

(10) Patent No.: US 6,755,719 B2
(45) Date of Patent: Jun. 29, 2004

(54) END SURFACE POLISHING DEVICE AND END SURFACE POLISHING METHOD

(75) Inventors: Kisaburou Yoshida, Chiba (JP); Kouji Minami, Chiba (JP)

(73) Assignee: Seiko Instruments Inc., Chiba (JP)

( * ) Notice: Subject to any disclaimer, the term of this patent is extended or adjusted under 35 U.S.C. 154(b) by 0 days.

(21) Appl. No.: 10/385,185

(22) Filed: Mar. 10, 2003

(65) Prior Publication Data

US 2003/0176149 A1 Sep. 18, 2003

(30) Foreign Application Priority Data

Mar. 15, 2002 (JP) .................................... 2002-072708

(51) Int. Cl.⁷ .............................................. B24B 1/00
(52) U.S. Cl. ................... 451/6; 451/5; 451/8; 451/9; 451/10; 451/11; 451/285; 451/287
(58) Field of Search ........................ 451/5, 8, 9, 41, 451/11, 10, 283, 285, 6, 287, 398, 402

(56) References Cited

U.S. PATENT DOCUMENTS

| | | | | |
|---|---|---|---|---|
| 4,839,993 A | * | 6/1989 | Masuko et al. ............. | 451/283 |
| 5,007,209 A | * | 4/1991 | Saito et al. .................... | 451/41 |
| 5,025,592 A | * | 6/1991 | Yamamori et al. ............. | 451/5 |
| 5,349,784 A | * | 9/1994 | Grois et al. ................. | 451/314 |
| 5,361,470 A | * | 11/1994 | Hamada et al. ............. | 29/27 R |
| 5,503,590 A | * | 4/1996 | Saitoh et al. ................. | 451/11 |
| 5,667,424 A | * | 9/1997 | Pan .............................. | 451/6 |
| 6,010,538 A | * | 1/2000 | Sun et al. ............. | 156/345.13 |
| 6,277,004 B1 | * | 8/2001 | Matsumoto et al. ........ | 451/127 |
| 6,280,293 B1 | * | 8/2001 | Minami et al. ............... | 451/10 |

* cited by examiner

Primary Examiner—George Nguyen
(74) Attorney, Agent, or Firm—Adams & Wilks

(57) ABSTRACT

An end surface polishing device and an end surface polishing method capable of controlling the polishing amount of the rod-shaped members and shortening the polishing processing time are disclosed. The end surface polishing device for polishing a rod-shaped member attached to a holder in a pushing way, with a polishing member attached to a polishing plate provided on a main body and supported in a rotational and slidable way, is provided with distance detecting means for detecting the relative position of the holder and the polishing plate and measuring means for measuring the actual polishing length of the rod-shaped member supported by the holder, from the position detected by the distance detecting means.

16 Claims, 4 Drawing Sheets

END SURFACE POLISHING DEVICE AND END SURFACE POLISHING METHOD

BACKGROUND OF THE INVENTION

1. Field of the Invention

The present invention relates to an end surface polishing device and an end surface polishing method for polishing an end surface of a rod-shaped member such as ferrule supporting an optical communication fiber.

2. Description of Related Art

An optical communication fiber is formed by smoothly polishing ferrule end surface as well as fiber end surface like a mirror finished surface after attaching a fiber in a central hole of the ferrule that is a main member of a connector. When the finished ferrule surface and the polished fiber surface are not perpendicular to the center axis of the ferrule or there is a flaw on the polished surface, there is a problem of deteriorating the accuracy in the opposed position and increasing a loss in an optical connector formed by connecting the ferrules in an opposed way. Therefore, it is necessary to polish the ferrule surface containing an optical fiber with a high accuracy.

As the conventional end surface polishing device for polishing a rod-shaped member such as ferrule containing an optical fiber, there is a technique disclosed in, for example, JP-A-3-26456. The optical fiber end surface polishing device disclosed in this publication has an eccentric disc which rotates on a concentric circle of a rotating disc and a planet gear for transmitting the rotation of a motor for revolution to the eccentric disc, so to rotate and revolve a polishing plate in combination with the above, and the end surfaces of a lot of ferrules supported by a holder are pressed to a polishing member attached to the polishing plate, hence to be polished. In the ferrule polishing by using this end surface polishing device, polishing amount is controlled by the polishing time.

In the ferrule end surface polishing, however, it is necessary to polish the ferrules so that the length of the polished ferrules should be within a predetermined range. When the length of the ferrules is controlled according to the polishing time, there causes a large error between the actual polishing amount and the above and a highly accurate control of the polishing amount is difficult.

Further, in the conventional ferrule end surface polishing, generally, it is necessary to perform several times of polishing including rough polishing, medium polishing, and finish polishing. It is very troublesome to control the length of the polished ferrules of a final finish while watching the length of every polishing.

Further, in the conventional ferrule end surface polishing, it is necessary to measure the polishing amount of the ferrules after removing the ferrules from the holder. This is a troublesome work and takes a long time for the polishing processing.

SUMMARY OF THE INVENTION

In consideration of the above problems, an object of the invention is to provide an end surface polishing device and an end surface polishing method capable of controlling the polishing amount of a rod-shaped member and shortening the polishing processing time.

A first mode of the invention to solve the above problems is an end surface polishing device for polishing a rod-shaped member attached to a holder in a pushing way, with a polishing member attached to a polishing plate provided on a main body and supported in a rotational and slidable way, which device is characterized by comprising distance detecting means for detecting a position of the holder from a reference position having no movement in a vertical direction with respect to a rotational direction of the polishing plate, or variation amount of a position varying according as length of the rod-shaped member varies, during the polishing or during the rotation of the polishing plate.

A second mode of the invention is the end surface polishing device, in the first mode, characterized in that the distance detecting means detects a relative position of the holder and the polishing plate.

A third mode of the invention is the end surface polishing device, in the first mode or the second mode, characterized by comprising measuring means for measuring the actual polishing length of the rod-shaped member supported by the holder, from the position detected by the distance detecting means.

A fourth mode of the invention is the end surface polishing device, in the first mode, characterized in that the distance detecting means detects the distance between a predetermined position moving together with the holder and a predetermined position of the polishing plate.

A fifth mode of the invention is the end surface polishing device, in one of the first to the fourth modes, characterized in that the main body is provided with supporting means for supporting the holder in a movable way toward the polishing plate and pressing means for pushing the supporting means toward the polishing plate with a predetermined pressure.

A sixth mode of the invention is the end surface polishing device, in the fifth mode, characterized in that the distance detecting means is fixed to the supporting means and the distance detecting means moves according to the movement of the holder together with the supporting means.

A seventh mode of the invention is the end surface polishing device, in one of the first to the sixth modes, characterized in that the main body is provided with pressure detecting means for detecting a pressure for pushing the rod-shaped member supported by the holder to the polishing member and the measuring means measures a polishing length of the rod-shaped member when the pressure detecting means detects a predetermined pressure.

An eighth mode of the invention is the end surface polishing device, in one of the first to the seventh modes, characterized in that the distance detecting means is a contact-typed or non-contact typed sensor.

A ninth mode of the invention is the end surface polishing device, in one of the first to the eighth modes, characterized in that the distance detecting means is able to detect 1 mm and less variation amount of the actual polishing length of the rod-shaped member.

A tenth mode of the invention is the end surface polishing device, in one of the first to the ninth modes, characterized in that the holder supports a plurality of the rod-shaped members and the rod-shaped members are polished at once by the polishing member.

An eleventh mode of the invention is the end surface polishing device, in one of the first to the tenth modes, characterized in that the rod-shaped member is ferrule.

A twelfth mode of the invention is an end surface polishing method for polishing a rod-shaped member attached to a holder in a pushing way, with a polishing member attached to a polishing plate supported in a rotational and slidable way, which method is characterized by polishing while measuring the polishing length of the rod-shaped member by detecting a position of the holder from a reference position having no movement in a vertical direction with respect to a rotational direction of the polishing plate, or the variation amount of a position varying according as the length of the rod-shaped member varies, during the polishing or during the rotation of the polishing plate.

A thirteenth mode of the invention is the end surface polishing method, in the twelfth mode, characterized by polishing while measuring the polishing length of the rod-shaped member by detecting a relative position of the holder and the polishing plate.

A fourteenth mode of the invention is the end surface polishing method, in the twelfth mode, characterized by detecting a pressure for pushing the rod-shaped member supported by the holder toward the polishing member and measuring the polishing length when the detected pressure is a predetermined pressure.

A fifteenth mode of the invention is the end surface polishing method, in one of the twelfth to fourteenth modes, characterized by moving the holder toward the polishing plate and stopping the movement of the holder when the measured polishing length of the rod-shaped member becomes a predetermined length.

A sixteenth mode of the invention is the end surface polishing method, in one of the twelfth to the fifteenth modes, characterized by moving the holder toward the polishing plate and moving the holder to an opposite side to the polishing plate when the measured polishing length of the rod-shaped member becomes a predetermined length.

According to the invention, since it is possible to detect the distance between the holder and the polishing plate by the distance detecting means and measure the polishing length of the rod-shaped members by the measuring means, it is possible to measure the polishing length of the rod-shaped members even during the polishing. Thus, it is possible to control the polishing amount of the rod-shaped members at ease and with high accuracy and also shorten the polishing processing time.

DESCRIPTION OF PREFERRED EMBODIMENTS

Hereinafter, the invention will be described in detail according to embodiments.

(Embodiment 1)

Figure 1:
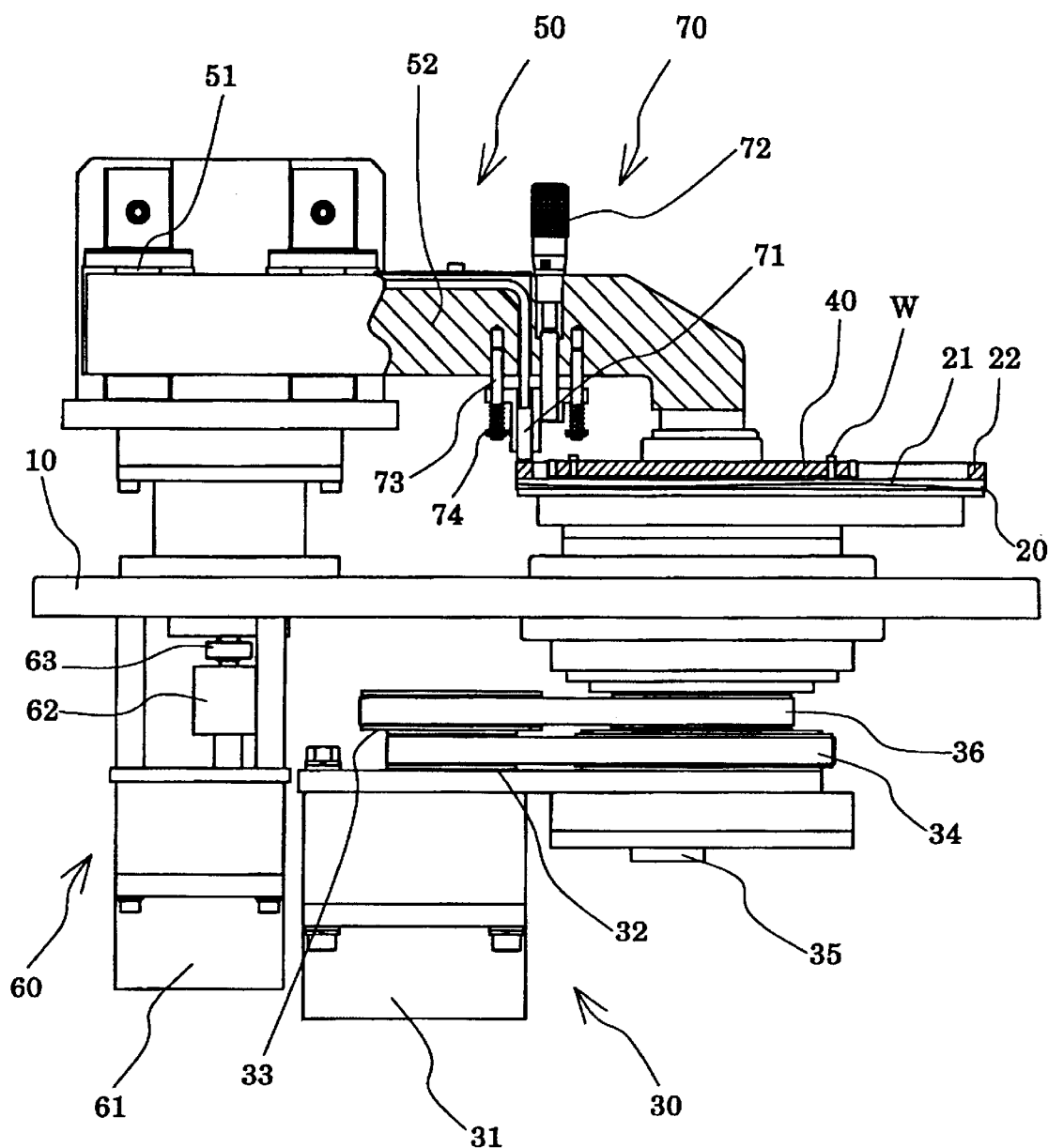
FIG. 1 is a cross sectional view of an important portion of an end surface polishing device according to the embodiment 1 of the invention.
Figure 2:
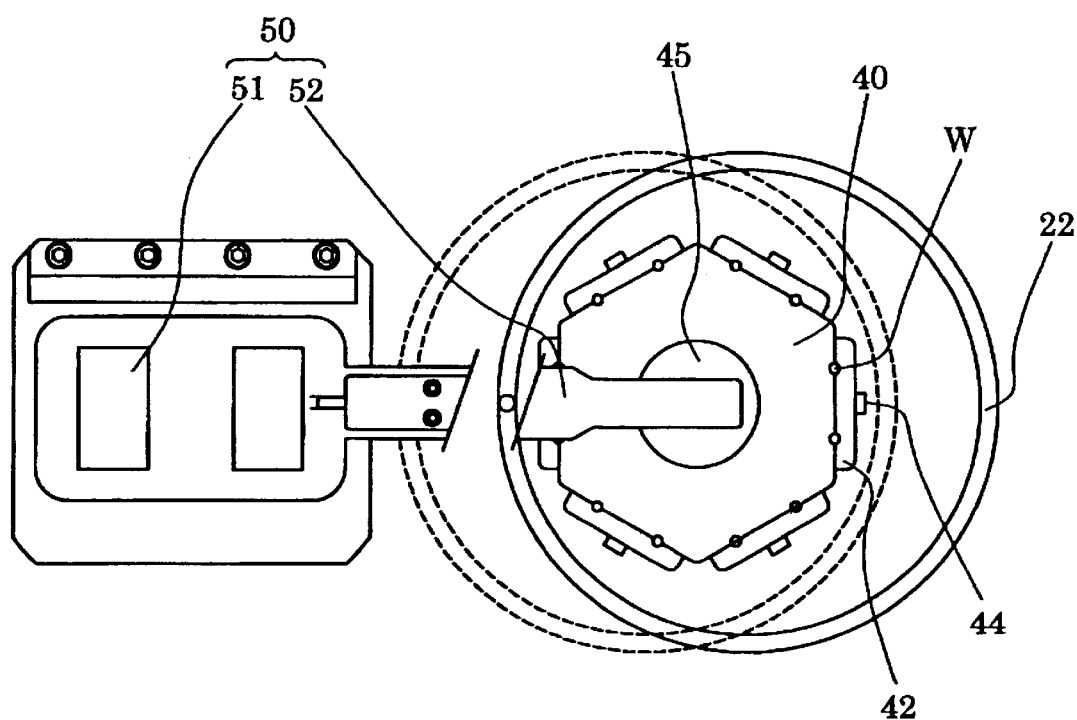
FIG. 2 is a top view of the important portion of the end surface polishing device according to the embodiment 1 of the invention.

FIG. 1 is a cross sectional view of an important portion of an end surface polishing device according to the embodiment 1 of the invention, and FIG. 2 is a top view of the end surface polishing device.

As illustrated in FIG. 1 and FIG. 2, the end surface polishing device of this embodiment comprises a main body 10, a polishing plate 20, with a polishing member 21 attached thereon, provided on the main body 10 in a rotatable and movable way, driving means 30 for driving the polishing plate 20, a holder 40 holding a plurality of rod-shaped members W, supporting means 50 for supporting the holder 40, which is provided on the main body 10 in a movable way toward the direction of the polishing plate 20, pressing means 60 for pressing the supporting means 50 supporting the holder 40 toward the polishing plate 20 with a predetermined pressure, and distance detecting means 70 for detecting a distance between a predetermined position of the polishing plate 20 and a predetermined position of the holder 40.

The polishing plate 20 can be rotated and moved by the driving means 30 specifically described later, and the polishing member 21 is attached on the top surface in the central portion.

On the top surface of the polishing plate 20, a detection ring 22 that is a detection object of the distance detecting means 70 is attached to the peripheral portion that is the area other than the polishing member 21 attached area.

The polishing plate 20 and the detection ring 22 are formed by a metal such as stainless steel and the top surface of the polishing plate 20 and the top surface of the detection ring 22 are formed with so high accuracy not to cause a wobble on the polishing surface of the polishing member 21.

The polishing member 21 provided on the top surface of the polishing plate 20 is formed by, for example, a polishing sheet attached on the polishing plate 20 directly or through an elastic member.

The driving means 30 rotating and moving this polishing plate 20 is formed by, for example, a rotational driving motor 31 and a plurality of gears, not restricted.

More specifically, a pulley 32 for rotation and a pulley 33 for revolution are provided around the rotation axis of the rotational driving motor 31.

The pulley 32 for rotation is jointed with a rotation axis 35 through the timing belt 34 for rotation and a plurality of rotation gears, not illustrated.

The pulley 33 for revolution is jointed with a revolution axis, not illustrated, through the timing belt 36 for revolution and a plurality of revolution gears, not illustrated.

The rotation axis 35 is provided at a position eccentric to the center of the revolution axis by a predetermined amount in a rotatable way and the top end of the rotation axis 35 is combined with the bottom surface of the polishing plate 20 through a plurality of connection pins, not illustrated.

This driving means 30 can rotate the rotational axis of the rotational driving motor 31, and rotate the rotation axis 35 and the revolution axis through the pulley 32 for rotation, the pulley 33 for revolution, the rotation gears, and the revolution gears, hence to rotate and revolve the polishing plate 20.

The holder 40 holding the several rod-shaped members W is supported on the polishing plate 20 by the supporting means 50 in a movable way toward the polishing plate 20 at the position of polishing plate 20 opposite to the polishing member 21.

Here, the holder 40 and the supporting means 50 will be described in detail.

Figure 3A:
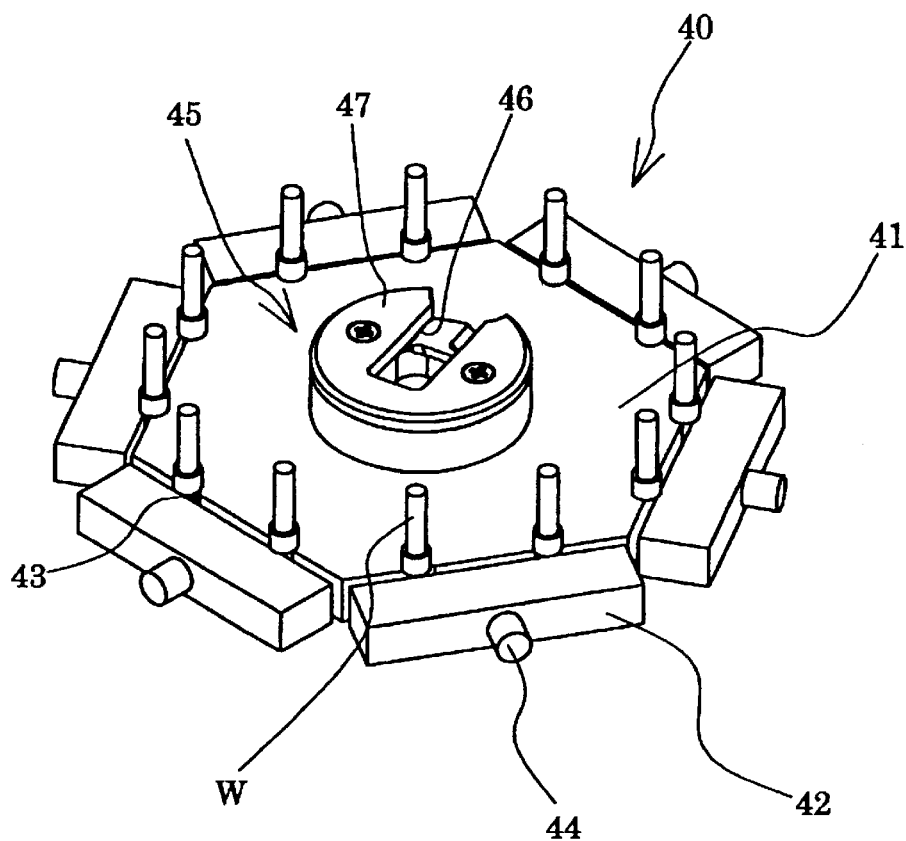
FIGS. 3(A) and 3(B) are a perspective view and a cross sectional view of the important portion of the holder and the supporting means according to the embodiment 1 of the invention.
Figure 3B:
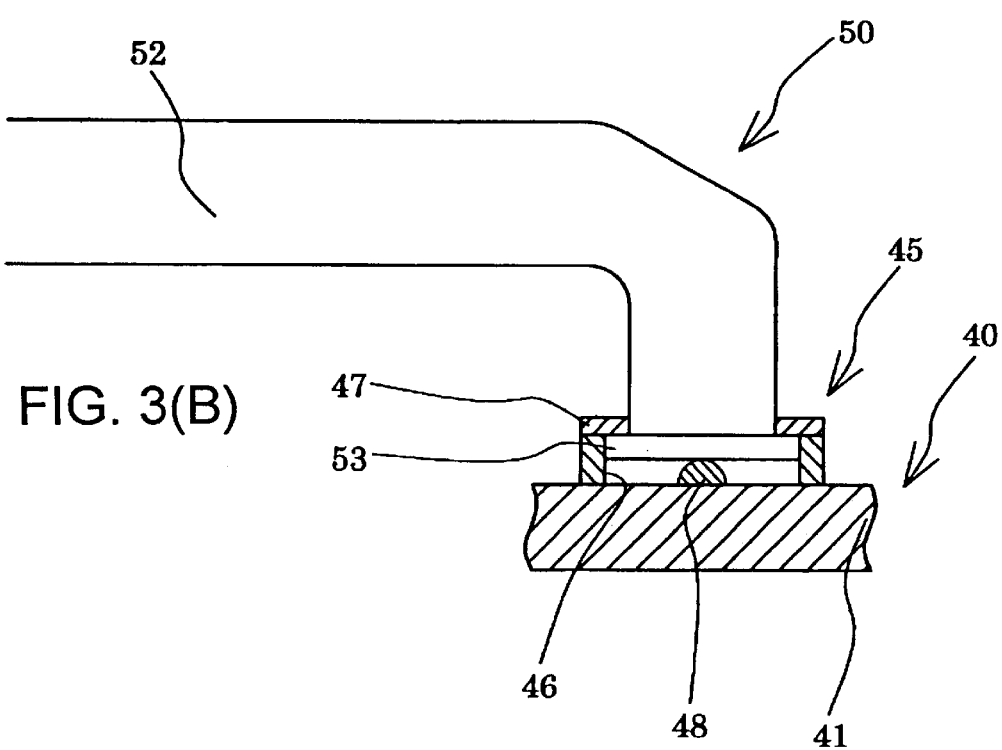

FIG. 3(A) is a perspective view of the holder, and FIG. 3(B) is a cross sectional view of an important portion of the holder and the supporting mechanism.

As illustrated in FIG. 3, the holder 40 includes a holder main body 41 and a plurality of holding pieces 42 mounted on the lateral sides of the holder main body 41.

The holder main body 41 has a polygonal shape and V-grooves 43 are provided on the respective lateral sides in the thickness direction.

Each holding piece 42 is fixed by each fixing screw 44 at the position opposite to the V-groove 43 of the holder main body 41. Each rod-shaped member W is pinched between the V-groove 43 and the holding piece 42, hence to fix the rod-shaped member W in a removable way from the holder 40.

In this embodiment, the holder main body 41 is formed in a hexagonal shape and by providing two V-grooves 43 on each lateral side, twelve rod-shaped members W can be fixed there. The rod-shaped member W may be a cylindrical one such as ferrule, or that one having a rectangular cross section such as a multi-core ferrule and a multi-core optical connection, and it is not restricted to the above. In the embodiment, ferrule having a cylindrical shape is used as the rod-shaped member W. Further, the holding piece 42 and the fixing screw 44 for fixing the rod-shaped member W to the holder main body 41 are not restricted to the above.

A boss 45 fixed to the supporting means 50 is provided on a substantially central portion of the holder main body 41.

While, the supporting means 50 includes a supporting portion 51 provided on the main body 10 and an arm portion 52 supported by the supporting portion 51 in a movable way, as illustrated in FIG. 1 and FIG. 2.

The supporting portion 51 is formed in two square poles provided on the main body 10 and a basic end portion of the arm portion 52 is inserted into the outer peripheral portion of the supporting portion 51 and supported.

The arm portion 52 is supported in a movable way toward the axis direction of the supporting portion 51 by inserting the basic end portion into the supporting portion 51.

The distal end portion of the arm portion 52 is bent toward the polishing plate 20, and the distal end is engaged into the boss 45 of the holder 40 in a state of restricting the movement of the holder 40 in the rotational direction and the gradient direction.

More specifically, the boss 45 of the holder 40 is provided with a rectangular cut-off portion 46 and a cover member 47 having a smaller aperture than the cut-off portion 46, which member is attached to the side of the aperture of the cut-off portion 46.

While, a rectangular flange 53 engaged in the cut-off portion 46 is provided in the distal end portion of the arm portion 52 and by inserting the flange 53 into the cut-off portion 46 from the lateral side of the boss 45, the lateral side of the flange 53 is abutted to the lateral side of the cut-off portion 46, thereby restricting the movement in the rotational direction.

Further, the flange 53 inserted into the cut-off portion 46 of the boss 45 is abutted to the cover member 47, thereby restricting the movement of the holder 40 in the direction toward the polishing plate 20. The movement of the holder 40 toward the arm portion 52 is restricted by a restricting portion 48 provided between the distal end surface of the arm portion 52 and the bottom surface of the cut-off portion 46. Namely, the arm portion 52 is abutted to the cover member 47 and the restricting portion 48, hence to support the holder 40 in a state of restricting its movement in the rotational direction and the gradient direction.

The arm portion 52 supporting the holder 40 as mentioned above is moved toward the polishing plate 20 by the pressing means 60, so to press the several rod-shaped members W supported by the holder 40 to the polishing member 21 on the polishing plate 20 with a predetermined pressure.

The pressing means 60 is not restricted to the above, as far as it can move the arm portion 52 toward the polishing plate 20. In the embodiment, for example, as illustrated in FIG. 1, the rotation of the driving motor 61 for pressing can be shifted to the movement of the arm portion 52 through a plurality of gears 62 and so on.

Further, in the embodiment, the pressing means 60 is provided with a pressure detecting means 63 such as a load cell for detecting the pressure data of pressing the rod-shaped members W fixed by the holder 40, to the polishing member 21. The pressure detecting means 63 may be positioned, for example, at the supporting portion 51, and its setting position is not restricted to this embodiment as far as it is the position capable of detecting the pressure data of pressing the rod-shaped members W fixed by the holder 40 to the polishing member 21.

The pressing means 60 can move the arm portion 52 according to the pressure data detected by the pressure detecting means 63 and make the distal end surfaces of the rod-shaped members W supported by the holder 40 abut the polishing member 21 with a desired pressure.

This can prevent from causing a polishing scratch on the distal end surfaces of the rod-shaped members W, thereby enabling a highly-accurate polishing.

The supporting portion 51 provided on the main body 10 of the supporting means 50 has a supporting mechanism such as a spring, not illustrated, so as to cancel the total weight of the arm portion 52 supported by the supporting portion 51 in a slidable way and the holder 40, so that the polishing weight from zero g should be loaded on the rod-shaped members W in polishing.

Further, the distance detecting means 70 is fixed in the area opposite to the polishing plate 20 of the arm portion 52 of the supporting means 50.

The distance detecting means 70 is to determine a reference position where there is no movement in the perpendicular direction to the rotational direction of the polishing plate 20 on the main body 10 and to detect a predetermined position of the holder 40 from the reference position or the variation amount of the position varying according as the length of the rod-shaped member varies, during polishing or during rotation of the polishing plate. For example, it is to detect the relative distance data between a predetermined position of the holder 40 and a predetermined position of the polishing plate 20 as the reference position, and in the embodiment, since the arm portion 52 is supported by the holder 40, the predetermined position of the holder 40 is fixed at the arm portion 52, and since the detection ring 22 is fixed to the polishing plate 20, the predetermined position of the polishing plate 20 is fixed at the detection ring 22.

This distance detecting means 70 includes a displacement sensor 71 and adjusting means 72 for adjusting the distance between the displacement sensor 71 and the polishing plate 20.

In the displacement sensor 71, the distal end surface thereof that is a detecting surface is provided on a position opposite to the top surface of the detection ring 22 that is an object to be detected. An optical, magnetic, or the like sensor of non-contact type that is in no contact with the top surface of the detection ring 22 and a contact typed sensor that is in contact with the top surface of the detection ring 22 are given as an example of the displacement sensor 71.

This embodiment adopts a displacement sensor by eddy current method, in which a high frequency magnetic field is generated by flowing a high frequency current in a coil within the displacement sensor 71, the magnetic flux is passed on the surface of the object to be detected and the eddy currents in the perpendicular direction is flowed there, so to vary the impedance of the coil, thereby detecting the distance from the object to be detected, according to the variation of the oscillating state.

It is preferable that the displacement sensor 71 can detect 1 mm and less variation of the distance from the object to be detected because it detects even the minute movement of the holder 40 moved according to the polishing of the rod-shaped members W as the distance data. The displacement sensor formed by the displacement sensor of eddy current method in the embodiment can detect the variation of 1 $\mu$m, thereby detecting the variation of the fine distance of the holder 40.

The displacement sensor 71 is provided between the arm portion 52 and the polishing plate 20 with a plurality of screw members 73 in a movable way so as to adjust the distance between the distal end surface that is the detecting surface and the detection ring 22. Force springs 74 are mounted on the outer peripheral surface of the screw members 73 and the force springs 74 support the displacement sensor 71 in a way of forcing it toward the arm portion 52.

While, the adjusting means 72 is formed by, for example, a micrometer head, which is designed in that the distal end surface, fixed to the arm portion 52, moving according to it may be abutted to the displacement sensor 71.

The adjusting means 72 can adjust the distance of the displacement sensor 71 from the polishing plate 20, actually from the top surface of the detection ring 22, by pressing the displacement sensor 71 against the force of the force springs 74.

When the bar-typed members W are polished here, the distance detecting means 70 moves toward the polishing plate 20 together with the holder 40 and the arm portion 52 by the polishing amount of the rod-shaped members W, where it can detect the distance data between the arm portion 52 and the top surface of the detection ring 22. Based on the distance data, it can calculate the actual polishing length of the rod-shaped members W at ease. Further, since the distance detecting means 70 detects the distance data between the predetermined position of the holder 40 and the predetermined position of the polishing plate 20, it can calculate the actual polishing length of the rod-shaped members W at ease and for sure even during the polishing processing of the rod-shaped members W.

Therefore, it is possible to control the polishing amount of the rod-shaped members W at ease and for sure and shorten the polishing processing time.

During the polishing of the rod-shaped members W, it is impossible to make the top surface of the detection ring 22 face the distal end surface of the displacement sensor 71 continuously, because of the rotation and fluctuation of the polishing plate 20. When obtaining the detection data continuously and using the detection data of the minimum value, however, it can be regarded as the detection data when the displacement sensor 71 faces the detection ring 22.

Figure 4:
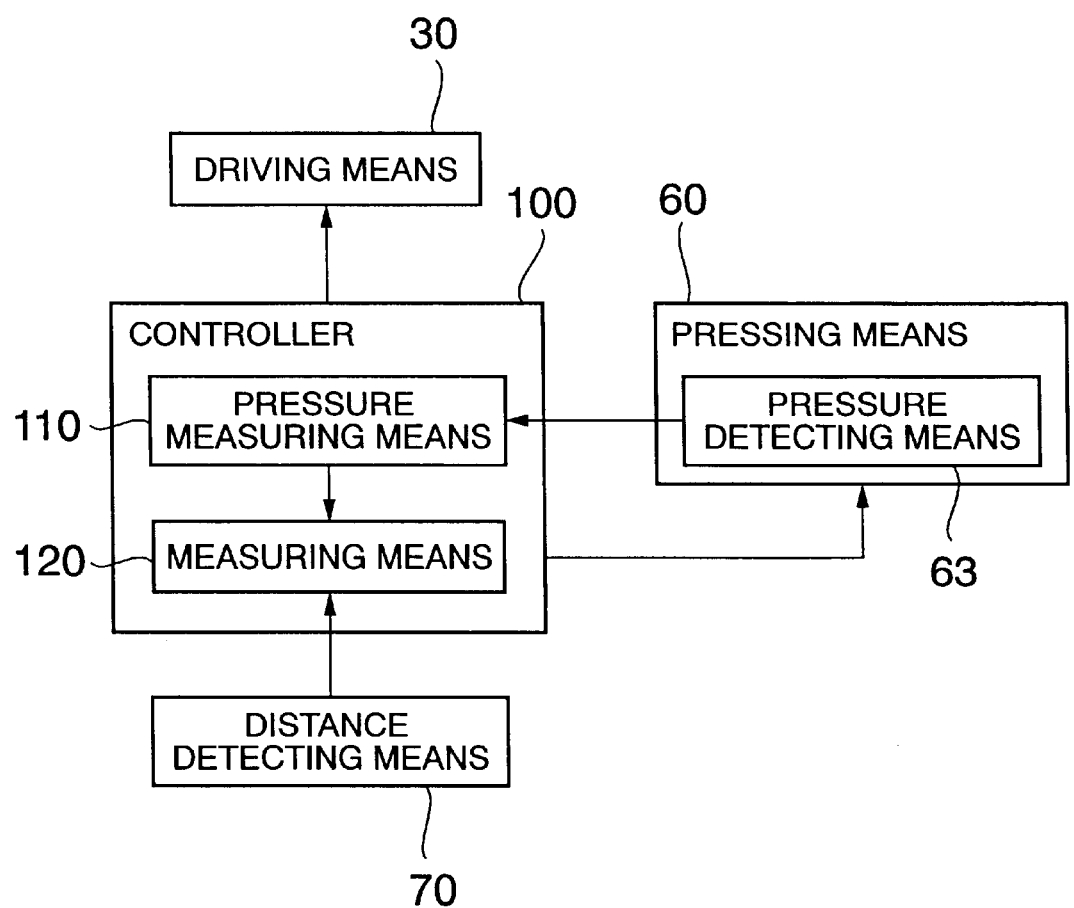
FIG. 4 is a block diagram showing a control system according to the embodiment 1 of the invention.

Hereinafter, a control system of the end surface polishing device of the embodiment will be described in detail. FIG. 4 is a control block diagram of the end surface polishing device.

As illustrated in FIG. 4, a controller 100 includes pressure measuring means 110 and measuring means 120.

The pressure measuring means 110 measures a pressure of the rod-shaped members W applied to the polishing member 21, according to the pressure data detected by the pressure detecting means 63 provided in the pressing means 60.

The controller 100 can control the pressing means 60, with a predetermined pressure obtained by the pressure measuring means 110, so that the rod-shaped members W are pushed toward the polishing member 21 with the predetermined pressure. Thus, highly accurate polishing can be achieved by preventing from generation of a polishing scratch on the distal end surface of the rod-shaped members W.

The measuring means 120 is to measure the actual polishing length of the rod-shaped members W, according to the distance data from the detection ring 22, which has been detected by the displacement sensor 71 of the distance detecting means 70.

The actual polishing length of the rod-shaped members W measured by the measuring means 120 may be the polishing amount of the rod-shaped members W or the whole length of the rod-shaped members W.

For example, when measuring the whole length of the rod-shaped members W, the whole length of the rod-shaped members W under polishing or after polishing can be calculated at ease, by obtaining the whole length of the rod-shaped members W before polishing and the polishing amount of the rod-shaped members W according to the thickness of the holder 40 and the protruded amount from the bottom of the holder 40 of the rod-shaped members W.

For example, when a polishing sheet is provided directly on the polishing plate 20 as the polishing member 21, the distance, which is detected by the distance detecting means 70, between the top surface of the detection ring 22 and the surface of the rod-shaped members W abutted to the polishing member 21 does not vary, with a pressure of the rod-shaped members W toward the polishing member 21. When using an elastic member and a polishing sheet, for example, as the polishing member 21, however, since the elastic deformation of the elastic member varies owing to the pressure of the rod-shaped members W toward the polishing member 21, the distance, which is detected by the distance detecting means 70, between the top surface of the detection ring 22 and the surface of the rod-shaped members W abutted to the polishing member 21 will vary.

Therefore, the measuring means 120 can calculate the polishing amount of the rod-shaped members W or the whole length of the rod-shaped members W with high accuracy, by calculating the elastic deformation amount of the polishing member 21 according to the pressure of the rod-shaped members W measured by the pressure measuring means 110 and the elastic coefficient of the elastic member.

The measuring means 120 may be designed to calculate the polishing amount of the rod-shaped members W or the whole length of the rod-shaped members W, only when the rod-shaped members W are pushed toward the polishing member 21 with a predetermined pressure, in other words, when the pressure obtained by the pressure measuring means 110 becomes a predetermined pressure.

This measuring means 120 can measure the minute polishing length of the rod-shaped members W with high accuracy, based on the distance data detected by the distance detecting means 70.

Thus, it is possible to control the polishing amount of the rod-shaped members W with high accuracy.

Further, the measuring means 120 can measure the highly accurate polishing amount of the rod-shaped members W, by calculating the position of the distal end surface of the rod-shaped members W according to the pressure of the rod-shaped members W toward the polishing member 21 obtained by the pressure measuring means 110.

When the actual polishing length of the rod-shaped members W measured by the measuring means 120 becomes a predetermined value, the pressing may be stopped according to a control of the controller 100 toward the pressing means 60, or the pressing means 60 may be reversed so as to remove the holder 40 from the polishing plate 20.

Further, the controller 100 can control the number of rotation of the polishing plate 20 by controlling the driving means 30, thereby performing the highly accurate polishing of the rod-shaped members W.

(Another Embodiment)

Hereinabove, although the embodiment 1 of the invention has been described, the basic structure of the end surface polishing device and polishing method is not restricted to the above.

For example, in the above-mentioned embodiment 1, although the distance detecting means 70 is fixed to the arm portion 52 of the supporting means 50 so as to detect the distance data from the detection ring 22 on the polishing plate 20, it is not restricted to this, but, for example, the distance detecting means may detect the distance data from the main body, alternatively, the distance detecting means may be provided in the main body so as to detect the height of the arm portion. Namely, it has only to be able to detect the position of the holder from the reference position of having no movement in the perpendicular direction to the rotational direction of the polishing plate, or the variation of the position varying together with the variation of the length of the rod-shaped members.

Further, the distance detecting means is not restricted to the non-contact typed sensor nor the contact typed sensor, the distance detecting means may be formed by an encoder for detecting the rotation amount of the pressing driving motor 61 of the pressing means 60. In this case, the measuring means 120 may detect the moving amount of the holder 40 according to rotation amount of the encoder.

When the distance detecting means is realized by the encoder for detecting the rotation amount of the pressing driving motor 61, it is necessary to drive the encoder with a gear free from backlash.

As set forth hereinabove, since the invention is provided with the distance detecting means for detecting the relative position of the holder and the polishing plate and the measuring means for measuring the polishing length of the rod-shaped members according to the relative position detected by the distance detecting means, it is possible to control the polishing amount with high accuracy while measuring the polishing length of the rod-shaped members, even during the polishing processing of the rod-shaped members. Therefore, it is also possible to shorten the polishing processing time.

What is claimed is:

1. An end surface polishing device for polishing a rod-shaped member attached to a holder in a pushing way, with a polishing member attached to a polishing plate provided on a main body and supported in a rotational and slidable way, comprising distance detecting means for detecting a position of the holder from a reference position having no movement in a vertical direction with respect to a rotational direction of the polishing plate, or variation amount of a position varying according as length of the rod-shaped member varies, during polishing or during rotation of the polishing plate.

2. The end surface polishing device, according to claim 1, wherein the distance detecting means detects a relative position of the holder and the polishing plate.

3. The end surface polishing device, according to claim 1, comprising measuring means for measuring an actual polishing length of the rod-shaped member supported by the holder, from the position detected by the distance detecting means.

4. The end surface polishing device, according to claim 1, wherein the distance detecting means detects distance between a predetermined position moving together with the holder and a predetermined position of the polishing plate.

5. The end surface polishing device, according to claim 1, wherein the main body is provided with supporting means for supporting the holder in a movable way toward the polishing plate and pressing means for pressing the supporting means toward the polishing plate with a predetermined pressure.

6. The end surface polishing device, according to claim 5, wherein the distance detecting means is fixed to the supporting means and the distance detecting means moves according to movement of the holder together with the supporting means.

7. The end surface polishing device, according to claim 1, wherein the main body is provided with pressure detecting means for detecting a pressure for pushing the rod-shaped member supported by the holder to the polishing member and the measuring means measures a polishing length of the rod-shaped member when the pressure detecting means detects a predetermined pressure.

8. The end surface polishing device, according to claim 1, wherein the distance detecting means is a contact-typed or non-contact typed sensor.

9. The end surface polishing device, according to claim 1, wherein the distance detecting means is able to detect 1 mm and less variation amount of the actual polishing length of the rod-shaped member.

10. The end surface polishing device, according to claim 1, wherein the holder supports a plurality of the rod-shaped members and the rod-shaped members are polished at once by the polishing member.

11. The end surface polishing device, according to claim 1, wherein the rod-shaped member is ferrule.

12. An end surface polishing method for polishing a rod-shaped member attached to a holder in a pushing way, with a polishing member attached to a polishing plate supported in a rotational and slidable way, wherein polishing is carried out while measuring a polishing length of the rod-shaped member by detecting a position of the holder from a reference position having no movement in a vertical direction with respect to a rotational direction of the polishing plate, or variation amount of a position varying according as length of the rod-shaped member varies, during polishing or during rotation of the polishing plate.

13. The end surface polishing method, according to claim 12, wherein polishing is carried out while measuring the polishing length of the rod-shaped member by detecting a relative position of the holder and the polishing plate.

14. The end surface polishing method, according to claim 12, wherein a pressure for pushing the rod-shaped member supported by the holder toward the polishing member is detected and the polishing length is measured when the detected pressure is a predetermined pressure.

15. The end surface polishing method, according to claim 12, wherein the holder is moved toward the polishing plate and the movement of the holder is stopped when the measured polishing length of the rod-shaped member becomes a predetermined length.

16. The end surface polishing method, according to claim 12, wherein the holder is moved toward the polishing plate and then the holder is moved to an opposite side to the polishing plate when the measured polishing length of the rod-shaped member becomes a predetermined length.

* * * * *